US012252998B2

(12) United States Patent
Katz et al.

(10) Patent No.: US 12,252,998 B2
(45) Date of Patent: Mar. 18, 2025

(54) MAINTENANCE MINIMIZING TURBINE APPARATUS AND METHOD THEREFOR

(71) Applicant: ORMAT TECHNOLOGIES, INC., Reno, NV (US)

(72) Inventors: Alex Katz, Yavne (IL); Yossi Siman Tov, Yavne (IL); Oren Ram, Yavne (IL)

(73) Assignee: Ormat Technologies, Inc., Reno, NV (US)

( * ) Notice: Subject to any disclaimer, the term of this patent is extended or adjusted under 35 U.S.C. 154(b) by 0 days.

(21) Appl. No.: 18/280,806

(22) PCT Filed: Feb. 3, 2022

(86) PCT No.: PCT/IL2022/050146

§ 371 (c)(1),
(2) Date: Sep. 7, 2023

(87) PCT Pub. No.: WO2022/190080

PCT Pub. Date: Sep. 15, 2022

(65) Prior Publication Data

US 2024/0151157 A1 May 9, 2024

(30) Foreign Application Priority Data

Mar. 7, 2021 (IL) .......................................... 281301

(51) Int. Cl.
*F01D 25/16* (2006.01)
*F01D 5/00* (2006.01)
(Continued)

(52) U.S. Cl.
CPC ........... *F01D 25/162* (2013.01); *F01D 5/005* (2013.01); *F01D 11/003* (2013.01);
(Continued)

(58) Field of Classification Search
CPC ...... F01D 25/162; F01D 5/005; F01D 11/003; F05D 2230/70; F05D 2230/72
See application file for complete search history.

(56) References Cited

U.S. PATENT DOCUMENTS 9,080,464 B2 * 7/2015 Arase ........................ F02C 3/14
10,718,236 B2 7/2020 Batscha et al.
(Continued)

FOREIGN PATENT DOCUMENTS

DE 102019210359 A1 1/2021
KR 20190083734 A 7/2019

OTHER PUBLICATIONS

PCT International Search Report and Written Opinion, PCT Application No. PCT/IL2022/050146, May 1, 2022, 7 pages.

*Primary Examiner* — Eldon T Brockman
(74) *Attorney, Agent, or Firm* — Fenwick & West LLP; Daniel R. Brownstone

(57) ABSTRACT

Turbine apparatus includes turbine wheels by which introduced motive fluid is expanded; a horizontally disposed turbine shaft which is rotatably supported by inlet-side and outlet-side bearings, such that the turbine wheels are fixedly connected to the turbine shaft between the inlet-side and outlet-side bearings; a turbine housing by which the turbine wheels and the outlet-side bearing are encased; and a bearing cartridge in which the inlet-side bearing is housed that is mounted externally to the turbine housing. The bearing cartridge is separable from the turbine housing to facilitate a maintenance operation when the inlet-side bearing is disengaged from the turbine shaft. In a method for accessing a malfunctioning inlet-side component contactable with the turbine shaft in order to perform a maintenance operation, the bearing cartridge is dismounted from a surface of the turbine housing and the bearing cartridge is
(Continued)

axially displaced in a direction away from the turbine housing.

19 Claims, 11 Drawing Sheets

(51) Int. Cl.
*F01D 11/00* (2006.01)
*F01D 25/28* (2006.01)

(52) U.S. Cl.
CPC ........ *F01D 25/285* (2013.01); *F05D 2230/70* (2013.01); *F05D 2230/72* (2013.01)

(56) References Cited

U.S. PATENT DOCUMENTS

| | | | | |
|---|---|---|---|---|
| 11,261,759 | B2 * | 3/2022 | Bae | F16M 1/04 |
| 2011/0000218 | A1 * | 1/2011 | Arase | F23R 3/60 60/805 |
| 2019/0085730 | A1 * | 3/2019 | Bae | F01D 25/285 |
| 2020/0131993 | A1 * | 4/2020 | Giesel | F01D 25/285 |
| 2021/0239133 | A1 * | 8/2021 | Kono | F01D 25/285 |

* cited by examiner

MAINTENANCE MINIMIZING TURBINE APPARATUS AND METHOD THEREFOR

FIELD OF THE INVENTION

The present invention relates to the field of power plants. More particularly, the invention relates to apparatus that minimizes turbine downtime during maintenance operations and a method therefor.

BACKGROUND OF THE INVENTION

The selection of a suitable turbine configuration is of primary importance when designing the power capacity of a power plant. Reliable operation of the turbine is contingent upon the structural strength of the shaft that enables rotor rotation and upon the ability of the bearings that rotatably support the turbine shaft to absorb both the radial load and axial thrust imposed by the motive fluid being expanded within the turbine.

A suitable bearing arrangement for supporting a turbine shaft is the rotor between bearings design where two shaft bearings are axially spaced.

The rotor between bearings arrangement is in contrast to an overhung bearing arrangement whereby two bearings are provided at the inlet end of the turbine shaft, which is proximate to the port through which the motive fluid is introduced into the turbine interior, and are distant from the outlet end of the turbine shaft being close to the port from which the expanded motive fluid exits the turbine. The overhung bearing arrangement simplifies assembly and maintenance as both bearings are at the same side of the shaft; however, it reduces the maximum load that can be supported due to the high bending stress that the shaft experiences. Due to the proximity of the two bearings, the moment arm resulting from the weight of the turbine wheels which is applied on the shaft is unidirectional, producing a significantly large moment that causes the shaft to bend or be susceptible to bending.

Another disadvantage of the overhung bearing arrangement is that the end of the turbine shaft that is unsupported by the bearings undergoes induced vibration phenomena, particularly flexural vibration. Such vibration results in damage to elements with small radial clearance such as seals, and even can cause grooves to be cut in the shaft surface. At times, the vibration amplitude increases to potentially damaging levels due to resonance.

An important consideration in the design of a rotor between bearings turbine is the ability to replace one of the supporting bearings and mechanical seals, or perform any other maintenance operation with these mechanical elements.

To access the turbine shaft or one of the supporting bearings, even the inlet-side bearing, a turbine casing of some prior art turbine apparatus is configured with a shell formed with a hatch or any other type of opening, for purposes of maintenance. The shell is generally positioned within a region of the turbine casing that is proximate to the exit of the expanded motive fluid from the last expansion stage as it flows towards the outlet. In this region, the pressure of the expanded motive fluid is relatively low, and therefore leakage is easier to avoid.

As a maintenance worker enters the shell interior through an outlet-side opening, the passage of the maintenance worker to the inlet-side bearing is impeded in order to perform a maintenance operation due to the presence of the intervening turbine wheels and nozzle rings. The maintenance operation can therefore be performed on the inlet-side bearing or on the adjacent mechanical seal only if the intervening turbine wheels and nozzle rings have been previously disassembled, resulting in inefficient utilization of manpower and in excessive downtime of the turbine.

It is an object of the present invention to provide turbine shaft bearing apparatus and method therefor for use in a rotor between bearings design that facilitates performing a maintenance operation in significantly reduced time relative to prior art practice.

Other objects and advantages of the invention will become apparent as the description proceeds.

SUMMARY OF THE INVENTION

Turbine apparatus, comprises a plurality of turbine wheels by which introduced motive fluid is expanded; a horizontally disposed turbine shaft which is rotatably supported by an inlet-side bearing and an outlet-side bearing, wherein said plurality of turbine wheels are fixedly connected to the turbine shaft between said inlet-side bearing and said outlet-side bearing; a turbine housing by which said plurality of turbine wheels and said outlet-side bearing are encased; and a bearing cartridge in which said inlet-side bearing is housed that is mounted externally to said turbine housing, wherein said bearing cartridge is separable from said turbine housing to facilitate a maintenance operation when said inlet-side bearing is disengaged from the turbine shaft.

A method for accessing a malfunctioning inlet-side component in abuttable relation with a turbine shaft in order to perform a maintenance operation comprises the steps of positioning temporary shaft support apparatus in engagement with a horizontally disposed turbine shaft which is rotatably supported by an inlet-side bearing and an outlet-side bearing; dismounting a bearing cartridge comprising said inlet-side component from an external surface of a turbine housing; and axially displacing said bearing cartridge in a direction away from the turbine housing.

DETAILED DESCRIPTION OF THE INVENTION

In conjunction with a turbine of a rotor between bearings design wherein the turbine shaft is supported by two axially spaced bearings, an inlet-side bearing and an outlet-side bearing, the turbine apparatus of the present invention comprises a cartridge for the inlet-side bearing and a structure for facilitating removal and replacement of the inlet-side bearing cartridge upon demand, as well as for supporting the turbine shaft when the bearing cartridge is removed.

Figure 1:
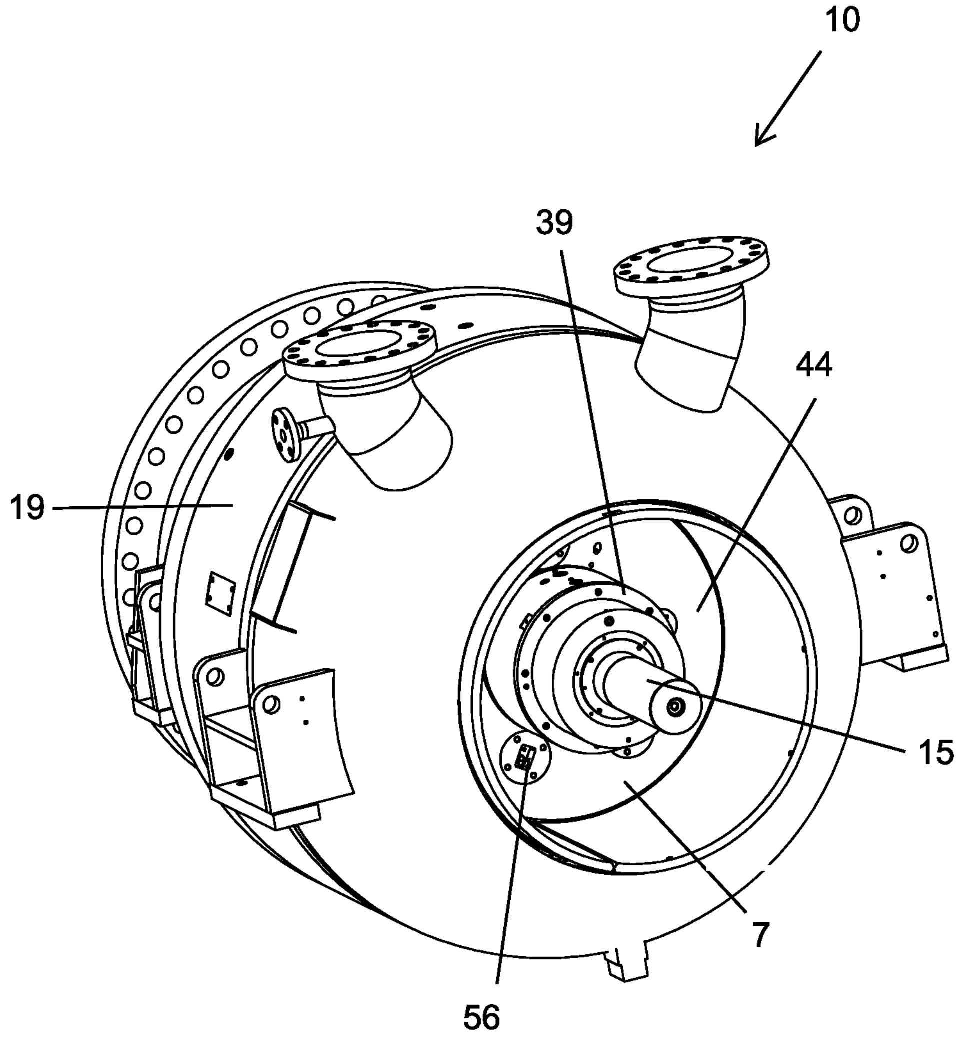
FIG. 1 is a perspective view of the inlet end and side of a turbine casing, showing turbine apparatus according to an embodiment.

FIG. 1 illustrates the inlet-end of a turbine 10 whose shaft 15 is supported by a bearing which is housed in a removable cartridge 39, according to one embodiment. The radially split casing 19 of turbine 10, which may also be referred to as the "turbine housing" has a central inlet-end cavity 7 of a sufficiently large axial depth to accommodate both the mounting therein during normal turbine operation and of the removal therefrom when being replaced, of cartridge 39. Turbine 10 is suitable for expanding organic motive fluid, particularly for use in producing power in an Organic Rankine Cycle (ORC) based power plant, but is also applicable to expanding other types of motive fluid as well, such as steam and gas.

The turbine apparatus that facilitates replacement of inlet-side bearing cartridge 39 by being axially displaced along turbine shaft 15 enables a significant reduction in maintenance work relative to prior art practice whereby the inlet-side bearing or associated seal could be removed and replaced only if the turbine wheels and nozzle rings were disassembled.

In prior art practice regarding a turbine of a rotor between bearings design, both the inlet-side and outlet-side bearings were mounted internally to the turbine casing, and each of these bearings could be accessed only if a maintenance worker were able to enter the turbine interior, usually via a turbine outlet that is proximate to the exit of the expanded motive fluid from the last expansion stage. Additional maintenance operations involving the disassembly of the turbine wheels and nozzle rings, which were very time consuming and required several working days to perform, were necessary in order to access the inlet-side bearing from the entry point of the downstream hatch.

Such time consuming maintenance operations are advantageously obviated by the ability of being able to axially displace inlet-side bearing cartridge 39 away from the turbine and without having to enter the turbine interior. Turbine casing 19 is configured with inlet-end cavity 7 to permit axial displacement of bearing cartridge 39 externally to the casing.

Also shown is a turbine housing end plate 44 on which bearing cartridge 39 is mounted during normal operation of turbine 10. End plate 44 is configured with a plurality of openings 56 which provide access to a corresponding slide assembly used to facilitate support of turbine shaft 15 during replacement or repair of one of the components housed within bearing cartridge 39, as will be described hereinafter. Each opening 56 can be covered by a cover sealed by a gasket to assure that there will be no leakage of motive fluid.

Figure 2:
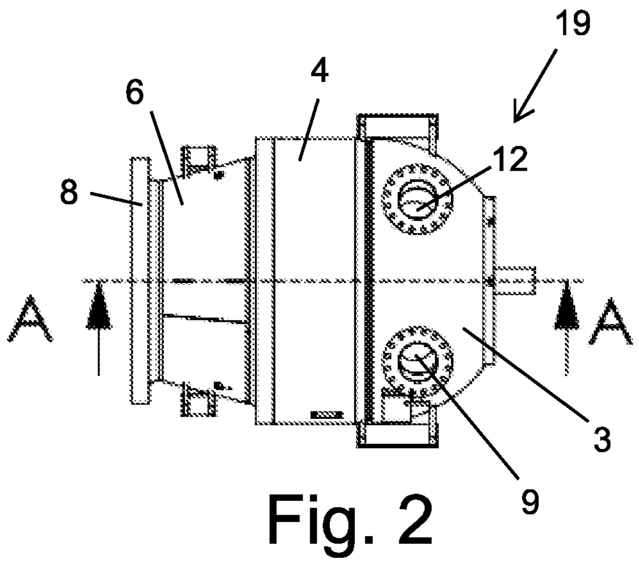
FIG. 2 is a top view of the casing of FIG. 1.

FIG. 2 illustrates a top view of turbine casing 19, shown to be of a radial split design with two radial inlets 9 and 12 that penetrate the inlet section 3 of the casing. Casing 19 also includes, in an increasing downstream direction, an intermediate turbine wheel chamber section 4, an expanded vapor chamber section 6, and an outlet section 8.

Figure 3:
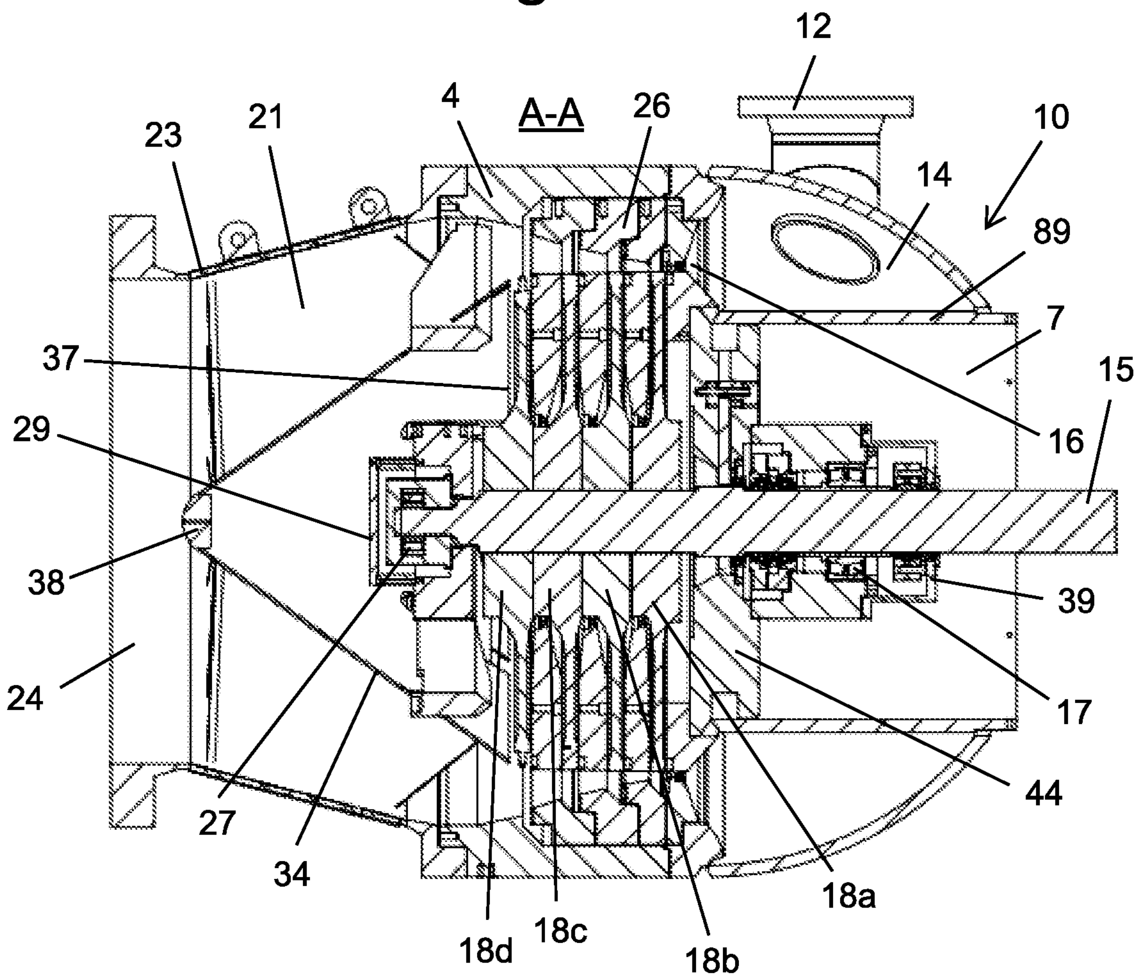
FIG. 3 is a cross sectional view of the turbine, cut along plane A-A of FIG. 2.

As shown in FIG. 3, turbine 10 is of the axial inflow and outflow type. Motive fluid vapor is introduced via radial inlet 12 into vapor chest 14 for controlling the rate of vapor flow and for preventing large flow losses, and is axially discharged via vapor chest port 16 to turbine wheels 18*a-d*. The rotatable turbine wheels 18*a-d*, fixedly connected to turbine shaft 15, such as by a keyed or shrunk connection, are provided in a chamber defined by the radial space between turbine shaft 15 and section 4 of the annular turbine housing, which is axially adjacent to vapor chest 14.

Each of the turbine wheels 18*a-d* constitutes one stage of turbine 10. The movable blades carried by a turbine wheel of a given stage interact with a corresponding set of fixed blades that are attached to the turbine housing and are arranged as a ring, often referred to as a nozzle ring 26 since the fixed blades act as nozzles. The motive fluid is introduced to nozzle ring 26, which causes a partial decrease in pressure and a partial increase in velocity of the motive fluid. The stream of increased-velocity motive fluid is directed onto the corresponding moving blades of the given stage to absorb the kinetic energy of the motive fluid.

This process is repeated for each stage, so that the motive fluid is increasingly expanded by the blades carried by each of turbine wheels 18*a-d*, such that the expanded vapor exiting the last stage turbine wheel 18*d* flows through expanded vapor chamber 21, located downstream to the turbine wheels and coincident with outer cone 23, e.g. a convergent, divergent or cylindrical cone, extending from the turbine housing, and exits turbine 10 via outlet 24, which is axially spaced from inlet 12. The expanded vapor exiting outlet 24 is directed to the condenser of the power plant or to a heat exchange component in fluid communication therewith.

This axial inflow and outflow configuration facilitates axial expansion, so that the vapor-derived expansion forces applied to turbine shaft 15 are substantially evenly distributed. Turbine shaft 15, which is coupled to a generator for example by a coupling, is consequently caused to rotate by these vapor-derived expansion forces and to generate electricity.

In turbine 10, turbine shaft 15 is properly positioned and rotatably supported by two axially spaced bearings 17 and 27 according to the rotor between bearings design, such that turbine shaft 15, bearings 17 and 27, and turbine wheels 18*a-d* are all coaxial. By virtue of the rotor between bearings design by which the two bearings 17 and 27 are located at opposite ends of turbine shaft 15, the strength and stiffness of the turbine shaft are significantly increased. The increased strength and stiffness provide turbine shaft 15 with the capability of physically supporting the four axially spaced turbine wheels 18*a-d*, or any other number of turbine wheels such as five, without being susceptible to much bending, as opposed to the prior art overhung bearing arrangement that permits only three turbine wheels to be supported by the turbine shaft. The increased number of turbine stages in turn results in an increase in the total power output produced by the turbine and in a corresponding increase in power plant efficiency, without having to increase the radial dimension of the turbine wheels that would increase the moment of inertia of the rotor and the centrifugal forces. Despite the addition of the fourth turbine wheel, or of any other number of turbine wheels, turbine 10 is generally rotationally balanced.

Inlet-side bearing 17 is housed in removable bearing cartridge 39 that assists in minimizing the maintenance operations that need to be performed. Outlet-side bearing 27, located proximate to expanded vapor chamber 21, is liable to be exposed to the relatively high temperature of the expanded motive fluid, and is encased within a solid protective bearing housing 29 in order to be isolated from the expanded motive fluid. Bearing housing 29, as described in U.S. Pat. No. 10,718,236, also provides sufficient cooling and lubrication of outlet-side bearing 27, so as to prevent the latter from overheating if contacted or otherwise exposed to the hot expanded motive fluid.

Exemplary bearing types that may be used for outlet side bearing 27 include a roller bearing, a tapered bearing, a spherical bearing, a cylindrical roller bearing, and a plain bearing in order to support the turbine shaft despite any thermal expansion of the turbine shaft that may take place.

Turbine 10 may be configured with an inner convergent cone 34 within an inner region of expanded vapor chamber 21, to provide additional means for isolating outlet side bearing 27 from the expanded motive fluid and for guiding the expanded motive fluid towards outlet 24. Inner cone 34 extends from an intermediate region of radially extending partition 37, which is positioned at the downstream side of final stage turbine wheel **18*d* and connected to the turbine housing at the outer cone 23**.

As described above, access to the turbine shaft and to the turbine wheels to perform maintenance operations has been made possible via the turbine outlet that is proximate to the exit of the expanded motive fluid from the last expansion stage.

Although the description relates to a turbine of the axial inflow and outflow type, it will be appreciated that the teachings of the present invention are also applicable to other types of turbines, such as the radial inflow type or the radial outflow type.

Figure 4:
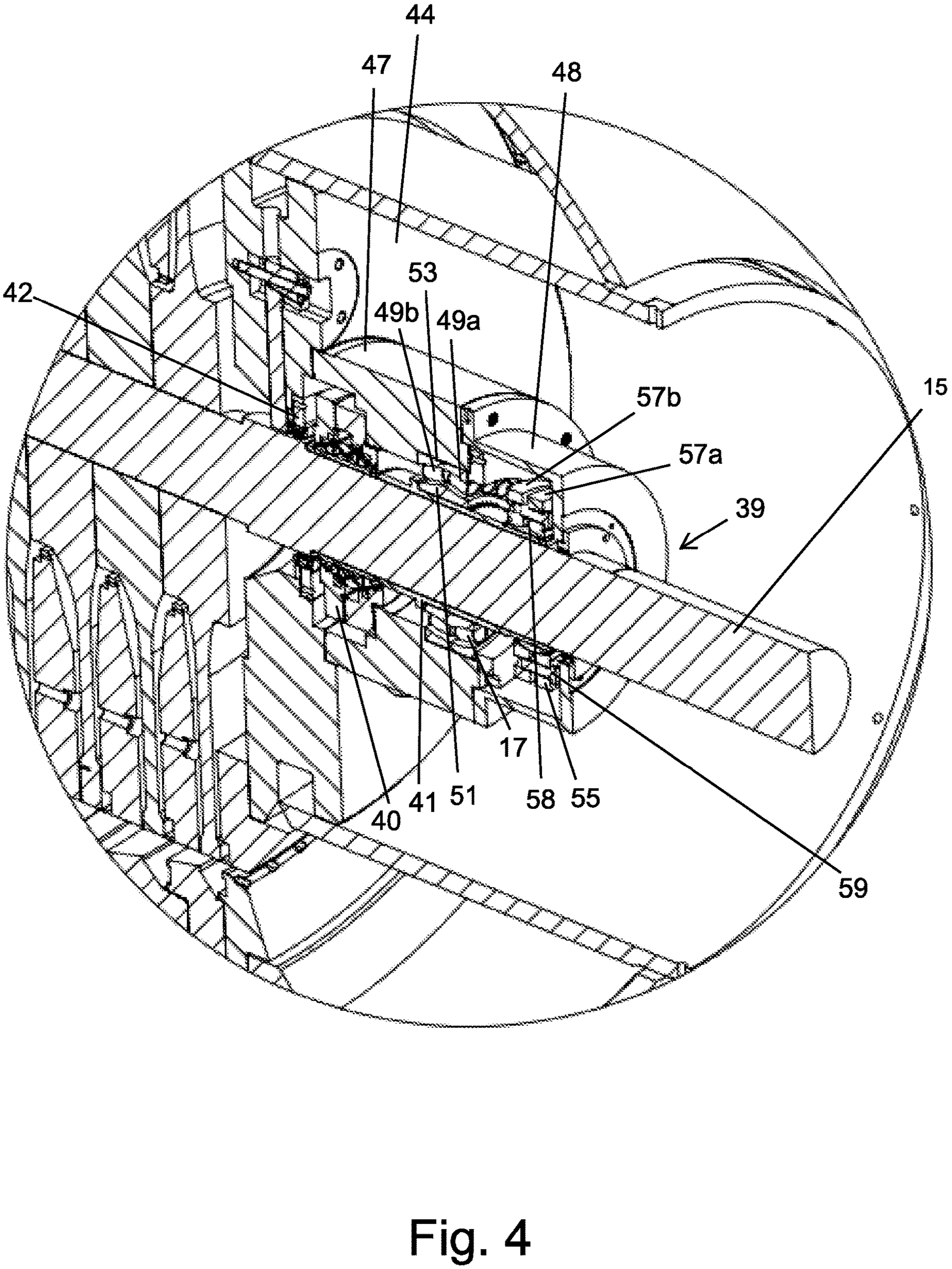
FIG. 4 is an enlarged perspective cross sectional view of the inlet side of the turbine shown in FIG. 3.

FIG. 4 illustrates an embodiment of inlet-end bearing cartridge 39, which comprises intermediate inlet-side bearing 17, downstream-positioned mechanical seal 40 and upstream-positioned shrink coupling 55. Bearing cartridge 39 is delimited by bearing housing 47 which is mountable on turbine housing end plate 44 and by radially smaller shrink coupling housing 48 connected to, and axially protruding from, bearing housing 47.

An inflatable seal 42 of a smaller radial dimension than bearing housing 47 is seated within turbine housing end plate 44, and remains in engagement with the end plate after removal of bearing cartridge 39, to prevent egress of hot and pressurized motive fluid from the turbine wheel chamber in an upstream direction along the turbine shaft due to the lack of the mechanical seat Since inflatable seal 42 remains in sealing engagement with turbine shaft 15 when bearing cartridge 39 is removed to perform maintenance operations, the motive fluid need not be evacuated from the turbine wheel chamber and the expanded vapor chamber to save valuable manpower and downtime. Inflatable seal 42 is generally made of an elastomeric material such as Viton®, and is able to be quickly inflated with compressed air, nitrogen or other suitable fluids and subsequently deflated when the same or another bearing cartridge is later mounted on the end plate.

Inlet-side bearing 17 mounted within bearing housing 47 is shown to be a spherical roller bearing having two axially separated single-row roller bearing elements **49*a* and 49*b*, each of which positioned in its own raceway, to handle a combined load associated with both an axial load imposed by the pressure differential applied by the motive fluid vapor between the inlet and outlet of the turbine and a radial load associated with the centrifugal force applied by the high-speed turbine shaft 15**.

The raceways are defined by an outer support member 53 press fitted and secured by a bolted cover to bearing housing 47 and functioning as the stator, and by inner bearing support member 51 functioning as the rotor and connected to sleeve 41. Sleeve 41 is in turn engageable with turbine shaft 15.

Alternatively, inlet side bearing 17 may also be a deep groove bearing, a hybrid bearing, an angular contact bearing having ball bearing elements, or a plain bearing with an integrated thrust bearing (such as a tilting pad bearing).

Sleeve 41 axially extends throughout the length of bearing cartridge 39, from mechanical seal 40 to shrink coupling 55. Sleeve 41 is also connected to the rotating portion of mechanical seal 40, which has rotating sealing faces pressed against stationary faces which are part of the stator portion of the mechanical seal.

The illustrated shrink coupling 55, shown to be a shrink disc, has two axially spaced rings **57*a* and 57*b*, e.g. wedge-shaped, and an inner hub 58 interfacing between the wedge-shaped surfaces and sleeve 41. When locking screws 59 are tightened within a corresponding tapered bore passing through rings 57*a* and 57*b*, the two rings are brought together, causing sleeve 41 to be clamped to turbine shaft 15 by radial pressure transmitted by hub 58. Inlet-side bearing 17 and mechanical seal 40 are rendered operational when sleeve 41 becomes clamped to turbine shaft 15**.

It will be appreciated that any other means suitable for causing sleeve 41 to be engaged to turbine shaft 15, such as a screwed or keyed arrangement, may also be used.

When shrink coupling 55 is expanded, sleeve 41 ceases to be engaged with turbine shaft 15, and bearing cartridge 39 is free to be axially slid along the turbine shaft after being disconnected from turbine housing end plate 44.

In another embodiment, the mechanical seal is disposed externally to the bearing cartridge. If the bearing is malfunctioning, the bearing cartridge is simply removed by being axially displaced along the turbine shaft in an upstream direction while the mechanical seal remains in place. In this embodiment, the sleeve of course extends from the bearing to the shrink coupling.

Figure 5:
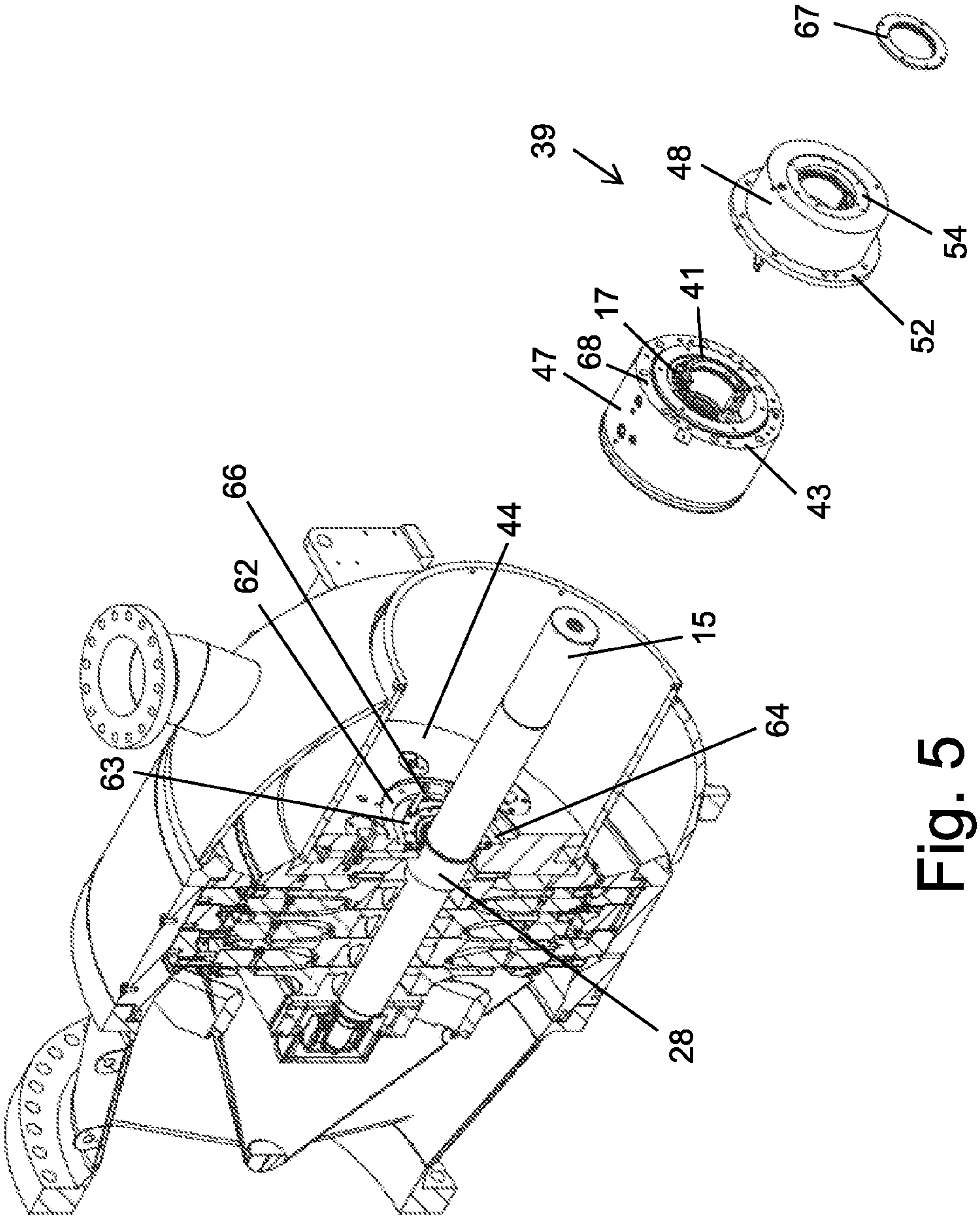
FIG. 5 is a perspective side and inlet end cross sectional view of the turbine of FIG. 3, shown when the turbine shaft and bearing cartridge are unsectioned, the bearing cartridge is dismounted, and the shrink coupling housing is separated from the bearing housing.

FIG. 5 illustrates bearing cartridge 39 after being disconnected from turbine housing end plate 44 while sleeve 41 protruding from bearing housing 47 remains in contact with bearing 17 and with mechanical seal 40 (FIG. 4). End plate 44 is shown to have an annular recess 62 surrounding turbine shaft 15 in which a downstream surface of bearing housing 47 is able to be seated and connected. For example bolt 66 is adapted to connect mounting hole 68 of bearing housing 47 with a corresponding mounting hole formed in annular recess 62. Inflatable seal 42 (FIG. 4) is adapted to be seated in annular recess 64 of a smaller radial dimension than recess 62. Another annular recess 63 having a larger radial dimension than recess 64 and smaller than recess 63 may be provided to accommodate the positioning of the mechanical seal, when bearing cartridge 39 is connected to end plate 44, although the mechanical seal does not contact the end plate.

Figure 6:
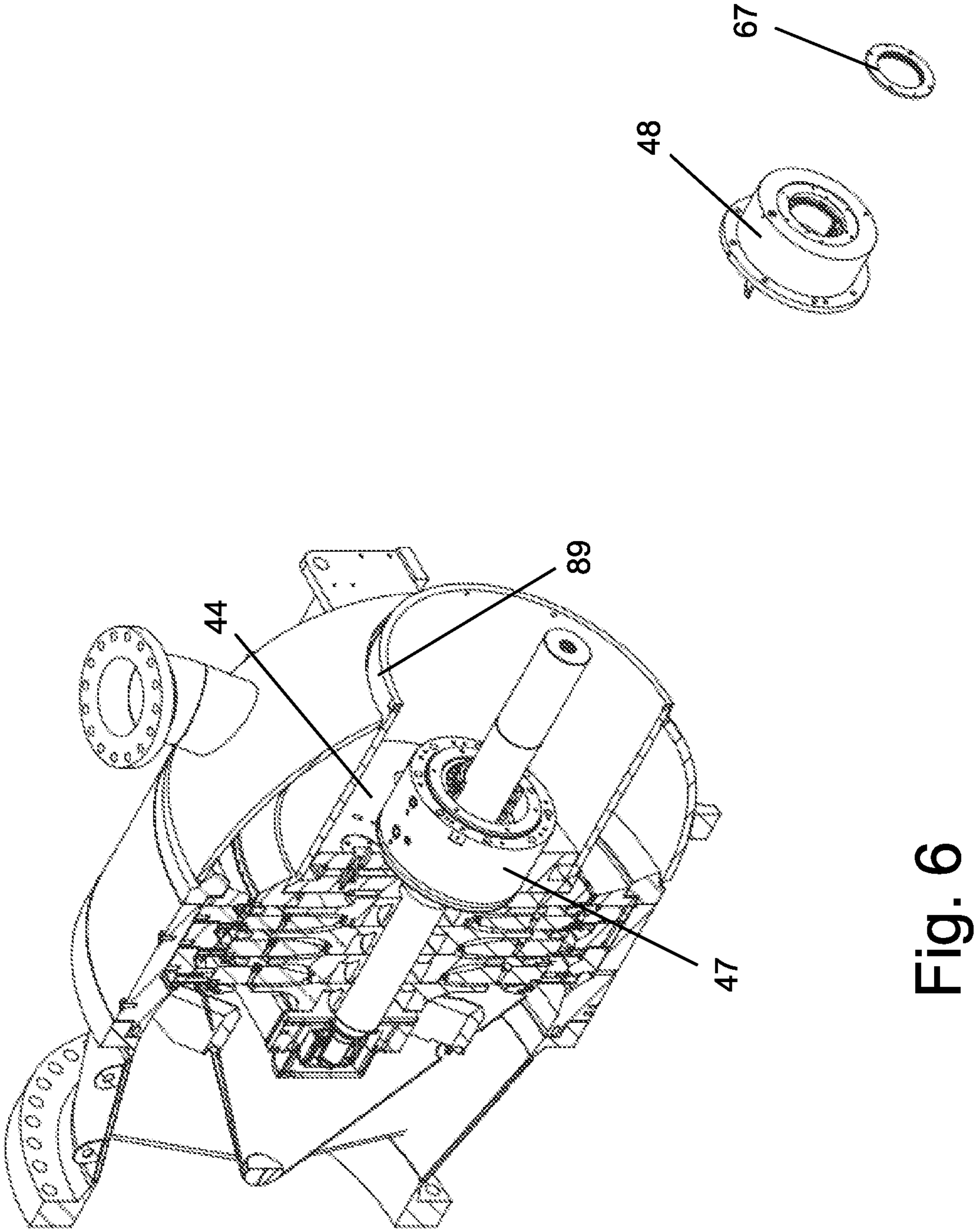
FIG. 6 is a perspective side and inlet end cross sectional view of the turbine of FIG. 3, shown when the turbine shaft and bearing cartridge are unsectioned, the bearing housing remains mounted, and the shrink coupling housing is separated from the bearing housing.

Shrink coupling housing 48 is able to be separated from bearing housing 47, and a flange 52 of the shrink coupling housing is adapted to be connected to substantially planar annular mounting surface 43 of the bearing housing. The inner diameter of annular cover 67, which is adapted to be connected to mounting surface 54 of shrink coupling housing 48, is slightly greater than the outer diameter of turbine shaft 15 so that it could freely rotate without interference. Alternatively, annular cover 67 may be made of a soft material and be in contact with turbine shaft 15. Shrink coupling housing 48 may be separated from bearing housing 47 while the bearing housing is mounted on turbine housing end plate 44 as shown in FIG. 6.

Reference is now made to FIGS. 7-14, which illustrate an embodiment of temporary shaft support apparatus, which is used to ensure that the turbine shaft will not move after the bearing cartridge is removed, particularly since the turbine shaft remains loaded by the turbine wheels and motive fluid.

In this embodiment, a plurality of radially extendable and retractable support rods are used to engage the turbine shaft when the inlet-side bearing cartridge is disconnected from the turbine housing and removed from the interior of inlet-end cavity 7 (FIG. 1). A central region of turbine shaft 15 may be configured with a radially protruding abutment 28 shown in FIG. 5 that facilitates engagement with the support rods by reducing the minimal distance along which the rods have to be displaced until being engaged with the turbine shaft. Abutment 28 is generally provided at a region of turbine shaft 15 that is axially separated from the bearing cartridge when the latter is mounted on the turbine housing end plate, to allow the support rods to be engaged with the turbine shaft both when the bearing cartridge is separated from the turbine housing and connected thereto.

Figure 7:
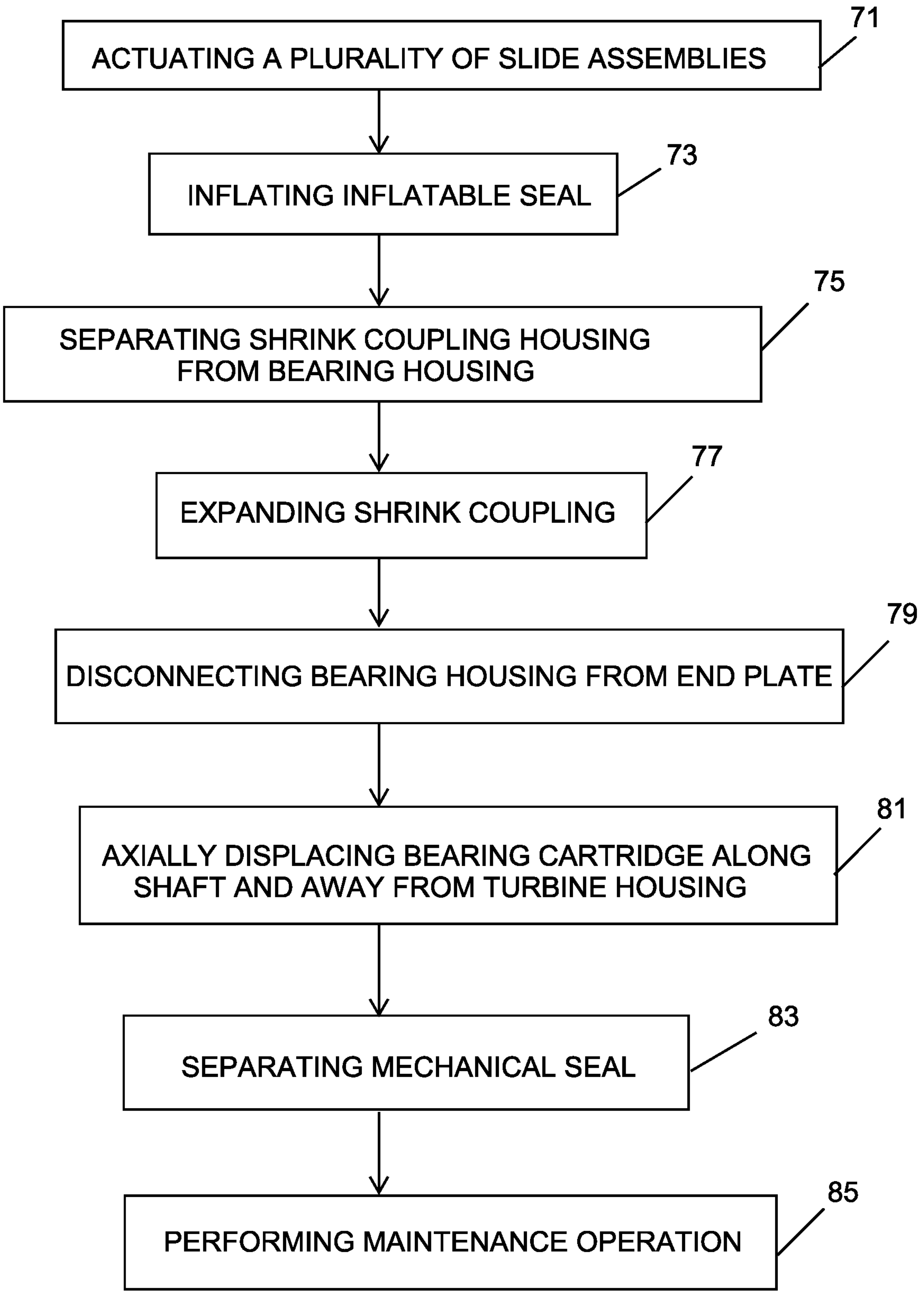
FIG. 7 is a method for accessing an inlet-side turbine shaft bearing.

FIG. 7 illustrates an embodiment of a method for accessing a malfunctioning inlet-side turbine shaft bearing using the temporary shaft support apparatus, prior to performing a maintenance operation. Firstly, each of a plurality of slide assemblies is actuated in step 71 until the corresponding support rods are radially displaced and engaged with the turbine shaft. Each of the slide assemblies is generally manually actuated by means of threaded rod 94 shown in FIG. 13 and a dedicated implement introducible through an end plate opening 56 (FIG. 1) and engageable with the threaded rod, but may also be electromechanically actuated, for example remotely, when an actuator fitted in the access plate opening is in drivable engagement with the threaded rod or any other suitable element in kinematic connection with the slide assembly, The inflatable seal located upstream to the support rods is radially inflated in step 73, such as by means in fluid communication with a source of pressurized gas of up to 8 bars, until it is set in sealing engagement with the turbine shaft to prevent motive fluid from escaping from the interior of the turbine.

Once the shrink coupling housing is separated from the bearing housing in step 75, the shrink coupling is expanded in step 77 to provide a clearance between the sleeve of the bearing cartridge and the turbine shaft. After the bearing housing is disconnected from the turbine housing end plate by removing bolts from the dedicated bores in step 79, the bearing cartridge is free to be axially displaced in step 81 along the turbine shaft and away from the turbine housing, such as by means of special rigging and a crane. After separating the mechanical seal in step 83, inlet-side bearing 17 can be replaced, or another maintenance operation related to the inlet-side bearing or to the mechanical seal is performed in step 85.

These steps are reversed so that the same or a different bearing cartridge will be able to be mounted.

It will be appreciated that the order of one or more of these steps may be changed, or be dispensed with, according to the discretion of the operator or of a supervisor.

Figure 8:
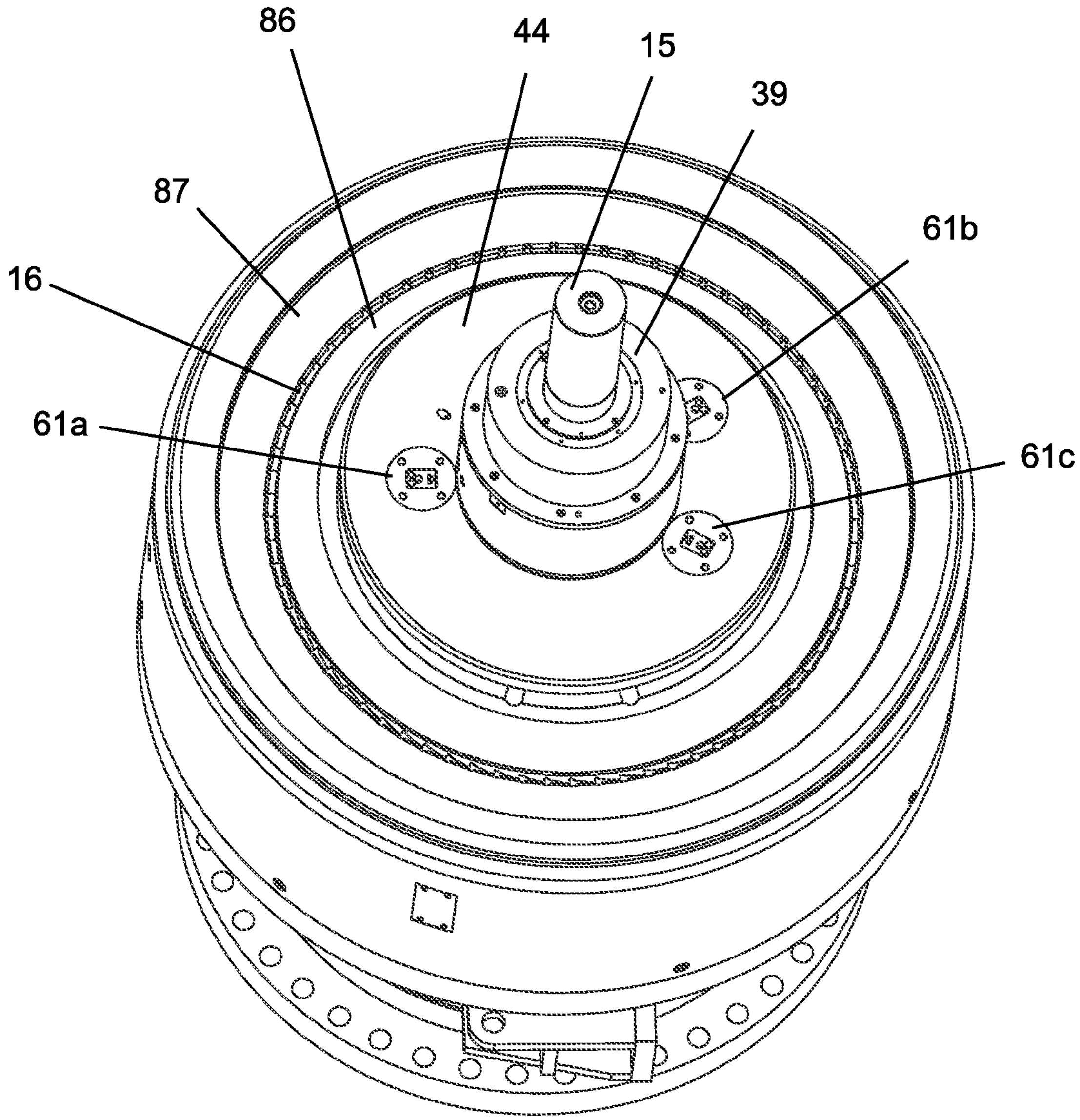
FIG. 8 is a perspective view of the inlet end of the casing of FIG. 1, shown without the inlet section.
Figure 9:
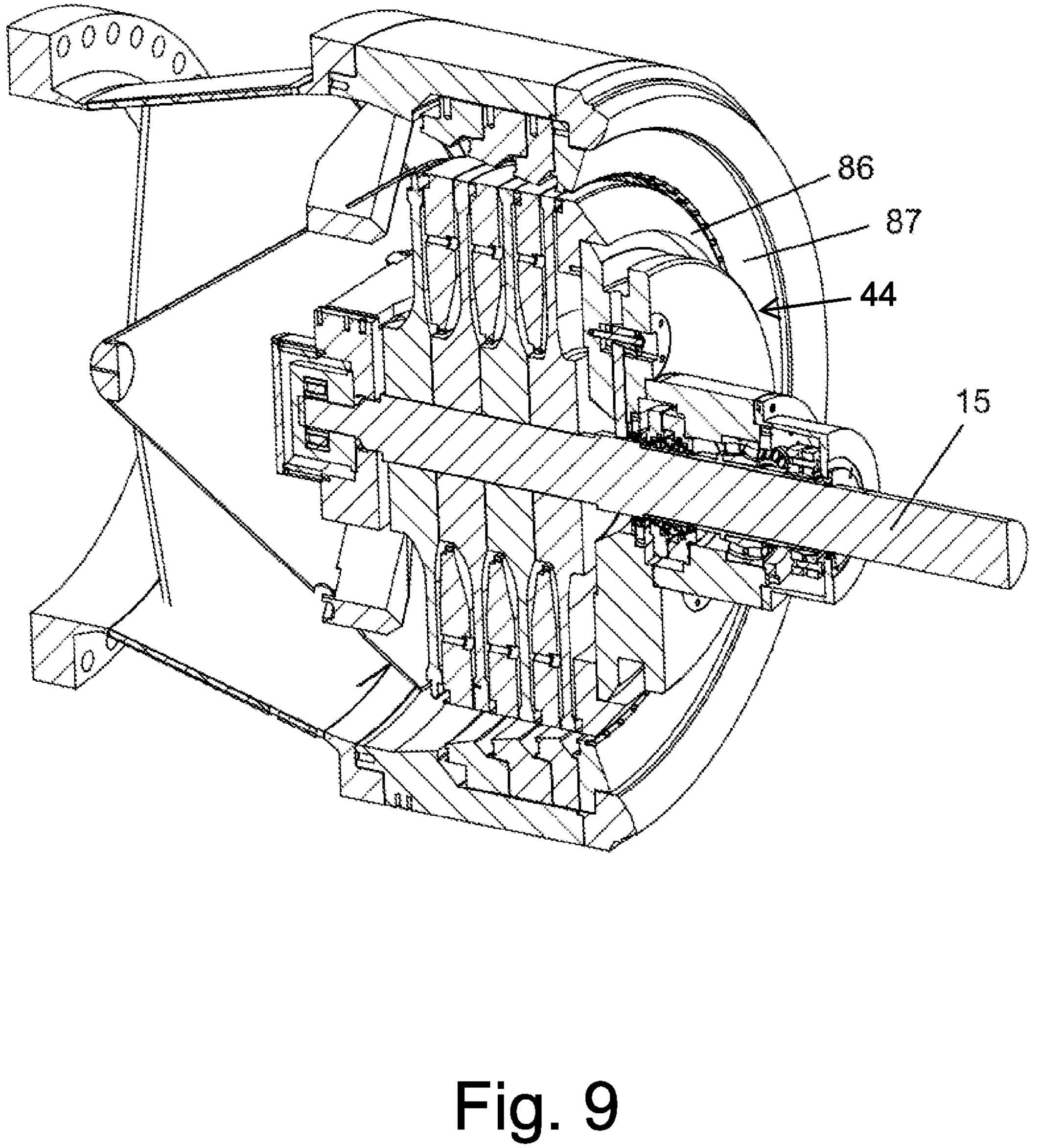
FIG. 9 is a perspective cross sectional view of the turbine of FIG. 1, shown without the inlet section.

FIG. 8 shows bearing cartridge 39 as it is mounted on turbine housing end plate 44 and surrounded by three circumferentially spaced slide assembly access plates 61*a-c* while the inlet section of the casing is removed. Annular end plate 44, which is substantially perpendicular to the longitudinal axis of turbine shaft 15, axially protrudes from inner and outer vapor chest guiding walls 86 and 87 of opposite angular inclinations with respect to the longitudinal axis of turbine shaft 15, as shown in FIG. 9, serving to guide the introduced vapor into circumferentially extending vapor chest port 16 (FIG. 3).

As shown in FIGS. 3, 6, 9 and 12, end plate 44 is connected to tubular shell 89 delimiting both inlet-end cavity 7 and vapor chest 14.

End plate 44 is bored with a plurality of radially extending grooves 93, in each of which a corresponding support rod 91 of a slightly smaller thickness than the groove is linearly displaceable. Each groove 93 intersects the axially extending access plate opening 56 leading to a corresponding slide assembly.

Figure 11:
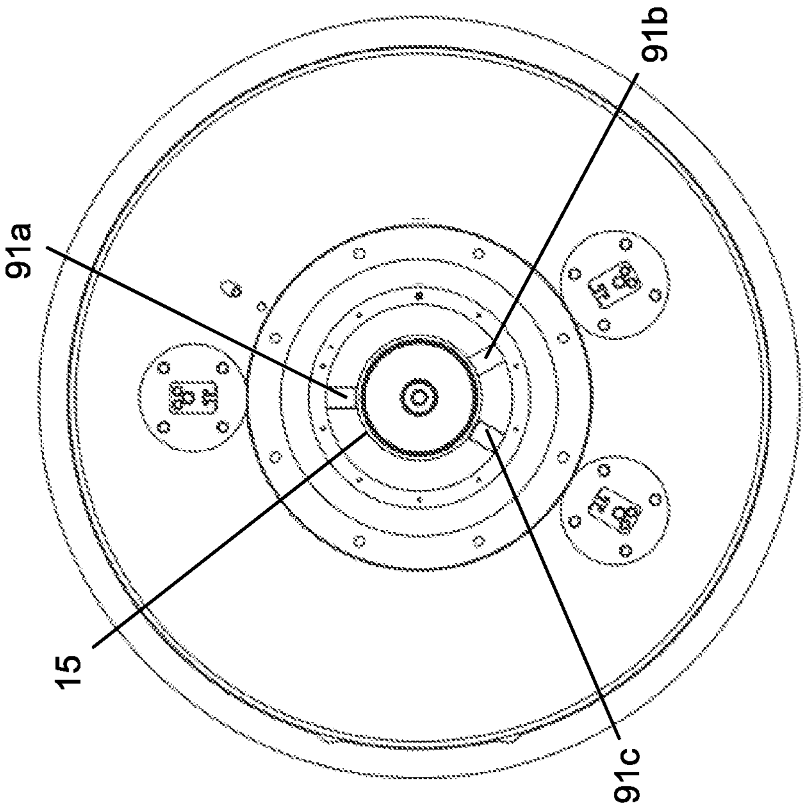
FIG. 11 is an end view of an end plate used in conjunction with the turbine apparatus of FIG. 1 without other portions of the turbine housing, showing support rods when engaged with the turbine shaft.
Figure 10:
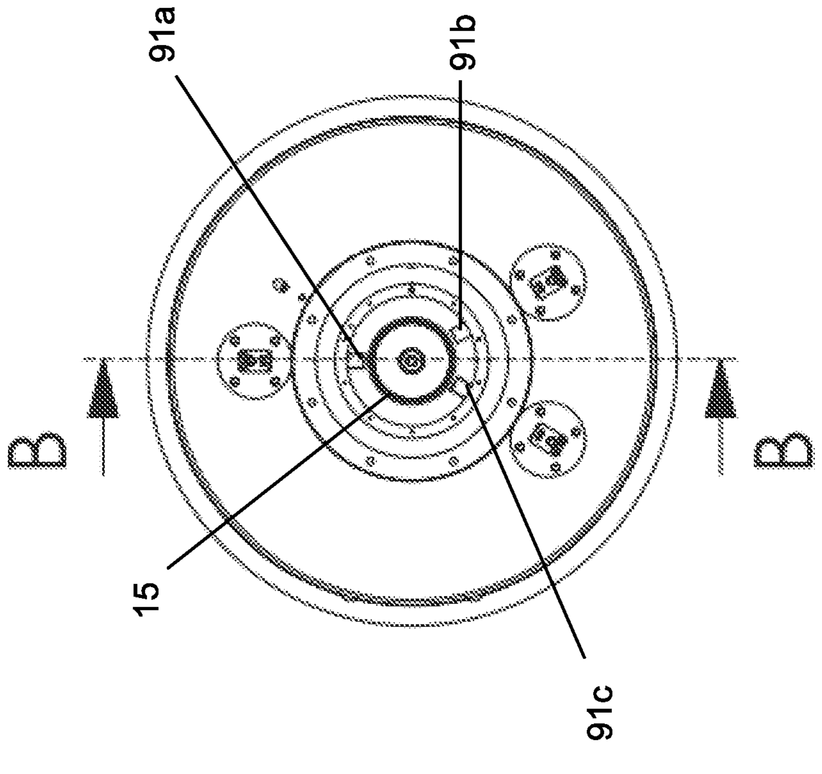
FIG. 10 is an end view of a turbine housing end plate used in conjunction with the turbine apparatus of FIG. 1 without other portions of the turbine housing, showing support rods when radially spaced from the turbine shaft.

FIG. 10 illustrates three support rods 91*a-c* when spaced from turbine shaft 15, and FIG. 11 illustrates the support rods when linearly displaced and in engagement with turbine shaft 15.

It is appreciated that any other number of circumferentially spaced support rods may be employed, as long as the turbine shaft is circumferentially balanced when engaged by the support rods.

Figure 12:
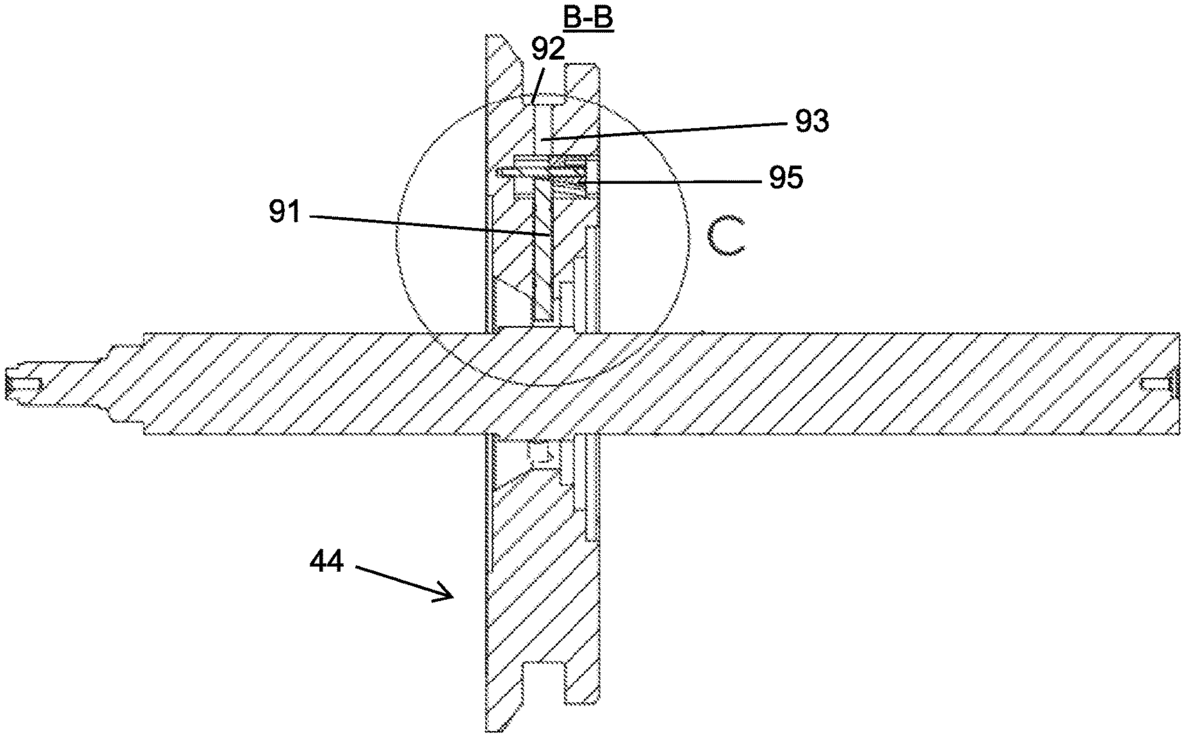
FIG. 12 is a cross sectional view of the end plate of FIG. 10, cut along plane B-B of FIG. 10.
Figure 13:
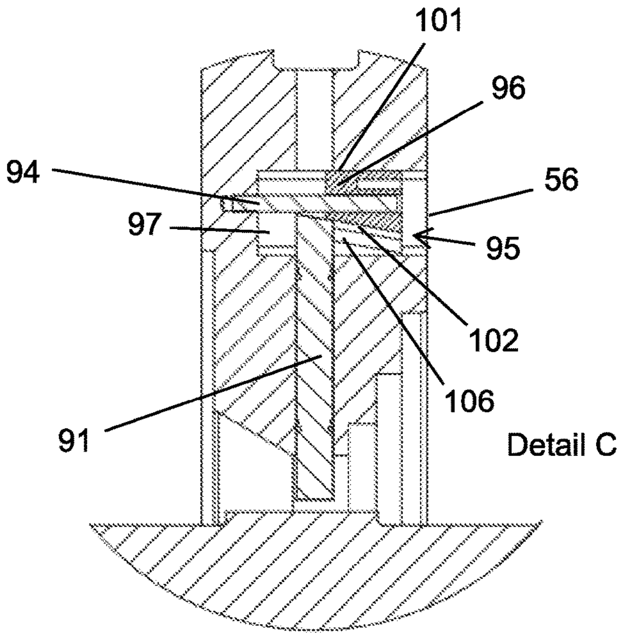
FIG. 13 is an enlargement of Detail C of FIG. 12.
Figure 14:
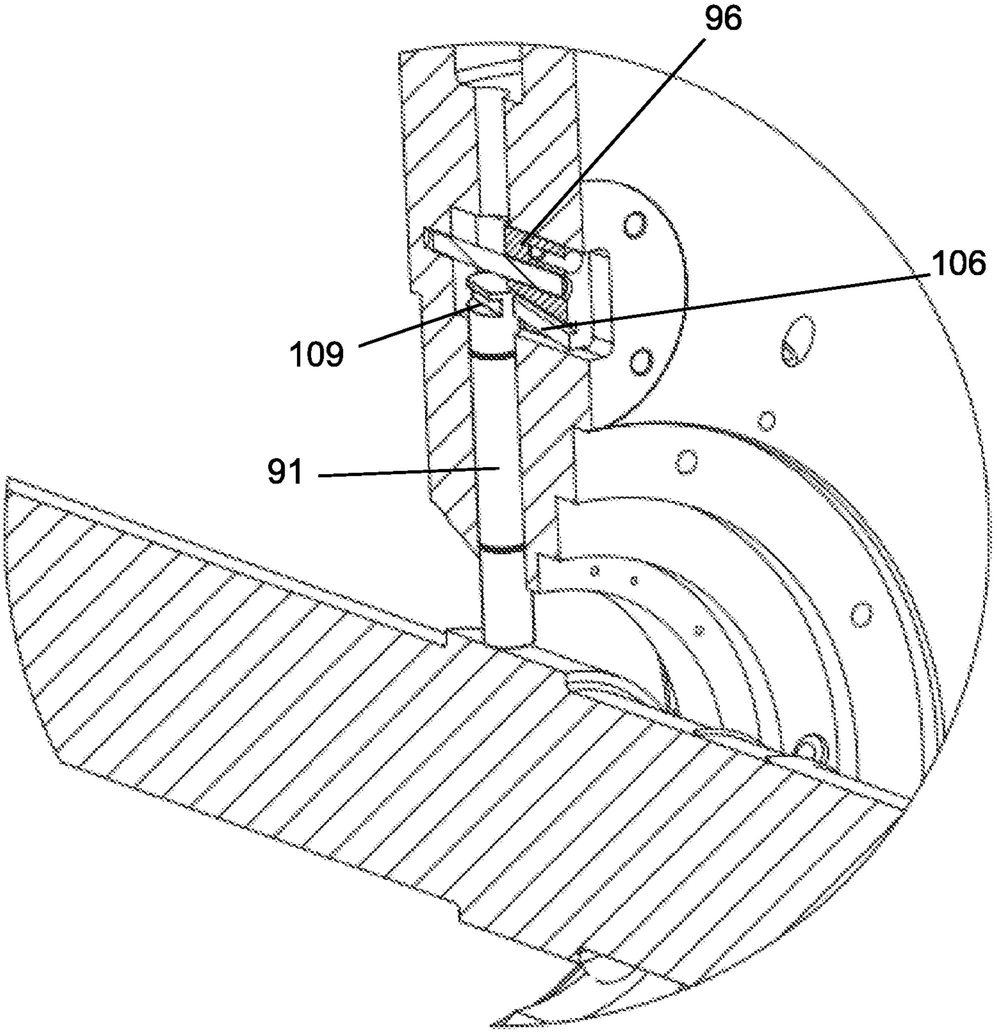
FIG. 14 is a perspective view of the end plate of FIG. 12, showing a transversal surface of a slide assembly cavity and a female coupler of a support rod when the support rod is separated from the slide member and rotated.

A slide assembly 95 is illustrated in FIGS. 12-14. Slide assembly 95 comprises a tapered slide member 96 that is linearly slidable along opposite faces of a slide assembly cavity 97 that axially extends from the access plate opening 56. A narrow track 106, which is adjacent and parallel to oblique radially inner edge 102 of slide member 96, transversally protrudes from one transversal side of the slide member, and is received in a female coupler 109 at the radially outer end of support rod 91, permitting relative motion between the slide member and the support rod.

Slide member 96 has an axially extending internally threaded bore with which a threaded rod 94 is threadedly engaged. When threaded rod 94 is rotated, generally by means of a dedicated implement, slide member 96 is forced to linearly slide. Since support rod 91 is constrained within groove 93 and is in engagement with track 106, axial displacement of slide member 96 causes radial displacement of support rod 91.

Although the slide member is shown to have an oblique radially inner edge in order to shorten the time needed to radially displace the support rod, a slide member whose radially inner edge is parallel to the radially inner edge of the slide assembly cavity is also within the scope of the invention.

It will be appreciated that other types of temporary shaft support apparatus may also be employed.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. Turbine apparatus, comprising:

a) a plurality of turbine wheels by which introduced motive fluid is expanded;

b) a horizontally disposed turbine shaft which is rotatably supported by an inlet-side bearing and an outlet-side bearing, wherein said plurality of turbine wheels are fixedly connected to the turbine shaft between said inlet-side bearing and said outlet-side bearing;

c) a turbine housing by which said plurality of turbine wheels and said outlet-side bearing are encased; and d) a bearing cartridge in which said inlet-side bearing is housed that is mounted externally to said turbine housing, wherein said bearing cartridge comprises a monolithic peripheral bearing housing which remains intact upon separation from said turbine housing to facilitate a maintenance operation when said inlet-side bearing is disengaged from the turbine shaft.

2. The turbine apparatus according to claim 1, wherein the bearing cartridge is mounted on an end plate of the turbine housing through which the turbine shaft extends and is axially displaceable along the turbine shaft in a direction away from the turbine housing to facilitate the maintenance operation when the inlet-side bearing is disengaged from the turbine shaft, without having to disassemble the turbine housing.

3. The turbine apparatus according to claim 2, further comprising temporary shaft support apparatus for supporting the turbine shaft when the bearing cartridge is separated from the turbine housing and the inlet-side bearing is disengaged from the turbine shaft.

4. The turbine apparatus according to claim 3, wherein the temporary shaft support apparatus comprises a plurality of radially extendable and retractable support rods which are engageable with the turbine shaft when extended to a fullest extent.

5. The turbine apparatus according to claim 4, wherein an axially intermediate region of the turbine shaft is configured with a radially protruding abutment that facilitates engagement with the plurality of support rods.

6. The turbine apparatus according to claim 4, wherein the end plate is substantially perpendicular to a longitudinal axis of the turbine shaft and is circular such that the turbine shaft axially protrudes from an opening that coincides with a center of the end plate.

7. The turbine apparatus according to claim 6, wherein each of the plurality of support rods is linearly displaceable within a corresponding groove bored within the end plate and that radially extends from the end plate opening to a periphery of the end plate.

8. The turbine apparatus according to claim 7, wherein each of the plurality of support rods is linearly driven by a corresponding slide member movably fitted in an axially extending slide assembly cavity formed within the end plate and that is accessible externally to the turbine housing, the slide assembly cavity being intersected by the corresponding radially extending groove.

9. The turbine apparatus according to claim 8, wherein a radially outer end of the support rod is engaged with the corresponding slide member, such that axial displacement of the corresponding slide member causes radial displacement of the support rod.

10. The turbine apparatus according to claim 1, wherein the bearing cartridge comprises one or more stator portions, one or more rotor portions, and means for disengaging the rotor portions of the bearing cartridge from the turbine shaft.

11. The turbine apparatus according to claim 10, wherein the disengaging means comprises a sleeve encircling the turbine shaft and connected to the one or more rotor portions of the inlet-side bearing, and a shrink coupling configured to cause the sleeve to be selectively engaged to the turbine shaft upon application of radially inward pressure to the turbine shaft and to be selectively disengaged from the turbine shaft upon release of the radially inward pressure.

12. The turbine apparatus according to claim 11, wherein the bearing cartridge further comprises a mechanical seal whose rotor portion which is pressable against a stator portion thereof is connected to the sleeve.

13. The turbine apparatus according to claim 12, further comprising an inflatable seal which, when inflated, is in sealing engagement with the turbine shaft after separation of the bearing cartridge from the turbine housing, to prevent egress of pressurized motive fluid from a turbine wheel chamber in an upstream direction along the turbine shaft.

14. The turbine apparatus according to claim 1, further comprising an inflatable seal which, when inflated, is in sealing engagement with the turbine shaft after separation of the bearing cartridge from the turbine housing, to prevent egress of pressurized motive fluid from a turbine wheel chamber in an upstream direction along the turbine shaft.

15. The turbine apparatus according to claim 14, wherein the inflatable seal is seated within a recess formed in an end plate of the turbine housing.

16. The turbine apparatus according to claim 1, further comprising the inlet-side bearing, wherein the inlet-side bearing is selected from the group consisting of a spherical roller bearing having two axially separated single-row roller bearing elements, a deep groove bearing, a hybrid bearing, an angular contact bearing having ball bearing elements, and a plain bearing with an integrated thrust bearing.

17. A method for accessing a malfunctioning inlet-side component in abuttable relation with a turbine shaft in order to perform a maintenance operation, comprising the steps of positioning temporary shaft support apparatus in engagement with a horizontally disposed turbine shaft which is rotatably supported by an inlet-side bearing and an outlet-side bearing; dismounting a bearing cartridge comprising said inlet-side component from an external surface of a turbine housing; and axially displacing said bearing cartridge in a direction away from the turbine housing.

18. The method according to claim 17, further comprising the step of radially expanding an inflatable seal seated in the external surface of the turbine housing until the inflatable seal is in sealing relation with the turbine shaft.

19. The method according to claim 17, further comprising the step of accessing the malfunctioning inlet-side component of the axially displaced bearing cartridge, the malfunctioning inlet-side component being the inlet-side bearing or a mechanical seal.

* * * * *